United States Patent

[11] 3,627,190

[72] Inventor Hubert J. Ramsey
Burlington, Mass.
[21] Appl. No. 871,873
[22] Filed Oct. 28, 1969
[45] Patented Dec. 14, 1971
[73] Assignee GTE Laboratories Incorporated

[54] APPARATUS FOR BONDING SEMICONDUCTOR ELEMENTS
9 Claims, 13 Drawing Figs.

[52] U.S. Cl. .......... 228/4, 29/471.1, 29/497.5, 156/498, 228/44
[51] Int. Cl. .......... B23k 1/00, B23k 5/00
[50] Field of Search .......... 228/1, 4, 44, 3, 3.5; 29/471.1, 493, 497.5; 156/73, 498

[56] References Cited

UNITED STATES PATENTS

| | | | |
|---|---|---|---|
| 3,533,155 | 10/1970 | Coucoulas | 29/493 X |
| 3,508,986 | 4/1970 | Berleyoung et al. | 156/73 |
| 3,475,814 | 11/1969 | Santangini | 29/497.5 |
| 3,497,410 | 2/1970 | Zagusta et al. | 156/498 X |

FOREIGN PATENTS

| | | |
|---|---|---|
| 467,365 | 1/1971 | Great Britain |

*Primary Examiner*—John F. Campbell
*Assistant Examiner*—R. J. Craig
*Attorney*—Irving M. Kriegsman

ABSTRACT: Apparatus for compliant bonding beam-leads of a semiconductor element to metallized areas of a substrate. Lengths of uniform ribbon of a deformable material are disposed between a heated bonding tool and the beam-leads. The bonding tool is pressed against the lengths of ribbon to compress the beam-leads between the ribbons and the metallized areas for bonding. After bonding, the used lengths of ribbon are replaced by new lengths from continuous supplies stored on reels.

INVENTOR
HUBERT J. RAMSEY

BY David M. Kay

AGENT

PATENTED DEC 14 1971

3,627,190

INVENTOR
HUBERT J. RAMSEY
BY David M. Keay
AGENT

INVENTOR
HUBERT J. RAMSEY

BY David M. Keay

AGENT

APPARATUS FOR BONDING SEMICONDUCTOR ELEMENTS

BACKGROUND OF THE INVENTION

This invention relates to apparatus employed in the production of semiconductor electrical translating devices. More particularly, it is concerned with apparatus for bonding beam-leaded semiconductor elements to conductive regions on substrates.

The beam-leaded semiconductor device is a recent development in the semiconductor art. Devices of this type comprise a semiconductor element including a chip or die of semiconductor material within which is fabricated by known planar processing techniques either an individual semiconductor component, such as a transistor, or a plurality of components suitably interconnected to provide a monolithic integrated circuit network. Formed at one of the major surfaces of the die during fabrication of the element are a plurality of beam-leads, primarily of gold, which are electrically connected to appropriate regions in the semiconductor die and extend outward beyond the edges of the die in an array parallel to the major surface of the die.

The beam-leads provide a means for making contact between the die and metallized portions of the substrate of a circuit board or device enclosure on which the semiconductor element is mounted. The semiconductor element is placed on the surface of the substrate with the beam-leads in alignment with metallized areas of the substrate. The beam-leads are then bonded directly to the metallized areas as by thermal compression bonding, ultrasonic bonding, or welding. Thus, the tedious, error-prone, time-consuming process of manually bonding lead wires between semiconductor dice and metallized areas of substrates is eliminated.

However, it has been found in practice that certain difficulties are encountered in attempting to bond the beam-leads of semiconductor elements to substrates. It is, of course, desirable to bond several of the beam-leads of an element to the metallized areas in a single bonding operation so that only one or two bonding operations are required. However, because of several factors including variations in the thickness of the metallization, variations in the thickness of the beam-leads, and wear in the bonding tool and other portions of the bonding mechanism, it has been extremely difficult to achieve uniform bonding conditions.

Various techniques have been employed in attempts to eliminate the foregoing difficulties. Recently there has been developed a technique of thermal compression bonding called "compliant bonding" in which a deformable material is placed between the bonding tool and the beam-leads. When the bonding tool is pressed against the deformable compliant material, the pressure of each of the beam-leads on the substrate is equalized and uniform bonding can be obtained. This technique is described in an article entitled "Compliant Bonding—A New Technique for Joining Microelectronic Components" by A. Coucoulas and B. H. Cranston, published in the *IEEE Transactions on Electron Devices*, Vol. ED–15, No. 9, Sept. 1968.

In order to employ the compliant bonding technique to bond all of the beam-leads of a semiconductor element to a substrate simultaneously, a strip of deformable material, typically aluminum, having a plurality of openings each of which conforms to the die is used. The deformable material is thicker than the die so that the strip may be positioned with the die in an opening and then the heated bonding tool pressed into contact with the compliant strip to achieve bonding. However, this procedure requires a specially prepared strip of deformable material having openings of appropriate configuration to conform to the configuration of the dice. The bonding apparatus must include appropriate mechanisms for indexing the strip for each bonding operation and precisely aligning an opening with each semiconductor element to be bonded. In addition, heat must be transferred from the bonding tool through the strip material to the regions of contact between the beam-leads and the substrate in order to achieve thermal compression bonding. The strip of deformable material dissipates heat, and dissipates it unevenly, thus making it difficult to obtain the proper temperature conditions simultaneously at all the regions of contact.

SUMMARY OF THE INVENTION

Apparatus in accordance with the invention for bonding the beam-leads of a semiconductor element to a substrate eliminates many of the difficulties recited above in the discussion of known procedures for compliant bonding. Apparatus in accordance with the invention includes means for positioning at a bonding location a substrate having a semiconductor element appropriately mounted thereon. A supply of compliant filamentary material is provided, and a length of filamentary material from the supply is positioned adjacent to leads of the semiconductor element by a filamentary material guide means. The apparatus also includes a bonding tool having a bonding surface. Advancing means move the bonding tool and the length of filamentary material to press the bonding surface against the length of filamentary material and compress the leads between the filamentary material and the substrate. Bonding means, including the bonding tool, bond the leads to the substrate while the leads are compressed between the filamentary material and the substrate by the bonding tool. The bonding tool and the length of filamentary material are then withdrawn from the leads by retracting means. A new length of filamentary material is fed from the supply by a filamentary material feeding means to replace the used length of filamentary material so that the apparatus is in readiness for the next bonding cycle.

BRIEF DESCRIPTION OF THE DRAWINGS

Additional objects, features, and advantages of bonding apparatus in accordance with the invention will be apparent from the following detailed discussion together with the accompanying drawings wherein.

GENERAL DESCRIPTION AND OPERATION

Figure 1:
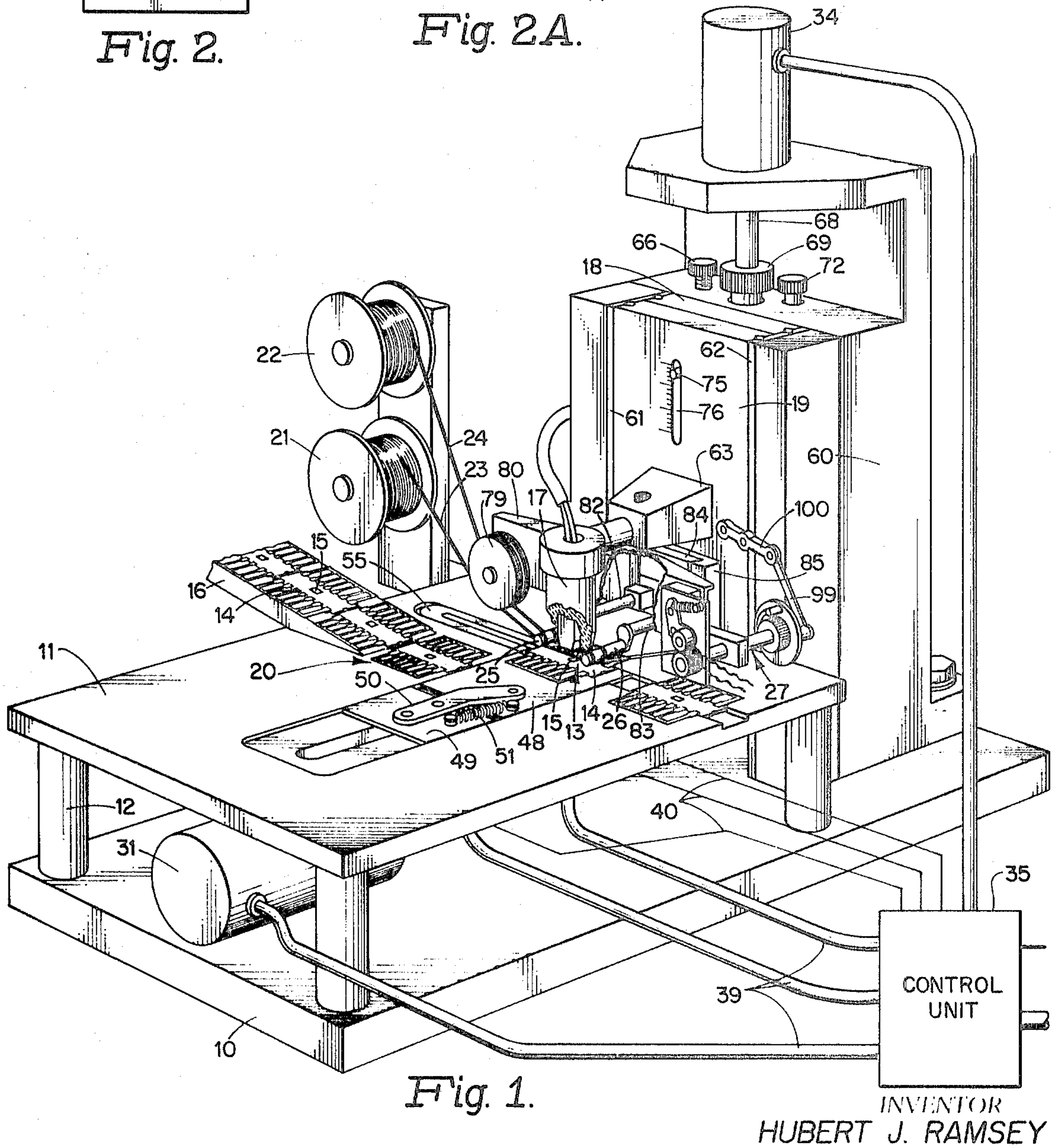
FIG. 1 is a perspective view of apparatus in accordance with the invention for bonding beam-leaded semiconductor elements to a substrate.

The bonding apparatus according to the invention as illustrated in FIG. 1 includes a base 10 on which a platform 11 is mounted by means of four supporting legs 12. A bonding location 13 is provided on the platform for receiving a substrate 14 and semiconductor element 15 and aligning them in position in the apparatus for bonding. The substrate 14 with the semiconductor element 15 mounted in proper position moves along an inclined track 16 and is urged into position at the bonding location 13 by a substrate feeding arrangement 20. Located directly above the bonding location 13 is a heated bonding tool 17. The bonding tool is mounted on an arrangement of two slides 18 and 19, and is moved vertically between a raised position and a lowered position. The apparatus also includes two reels 21 and 22 containing continuous supplies of a compliant filamentary material in ribbon form. Ribbons 23 and 24 from the reels 21 and 22 are guided into proper position between the bonding tool and the leads of the semiconductor element 15 by guide pins 25 and 26. The ribbons 23 and 24 pass from the guide pins 25 and 26 to a feeding mechanism 27. The apparatus is operated by air cylinders 31, 32, 33, and 34 (see also FIGS. 3A, 3B, and 3C) which are controlled by valves within a control unit 35 in response to the actuation of several microswitches 36, 37, and 38.

During operation of the apparatus a substrate 14 with a semiconductor element 15 mounted thereon is moved down the inclined track 16 (by a means not shown), engaged by the substrate feeding arrangement 20, and placed in position at the bonding location 13. Then the heated bonding tool 17 and the lengths of compliant ribbon 23 and 24 located between the guide pins 25 and 26 are lowered to press the surface of the bonding tool against the ribbons and compress the leads of the semiconductor element between the ribbons and the substrate. Sufficient pressure and heat are applied through the ribbons to the regions of contact between the leads and the substrate to obtain a thermal compression bond of each of the leads to the substrate. After bonding is complete, the bonding tool 17 and lengths of compliant ribbon 23 and 24 are withdrawn vertically from the semiconductor element and substrate. During retraction, the feeding mechanism 27 feeds the ribbons 23 and 24 to place new lengths of ribbon in position between the guide pins. The substrate feed arrangement 20 then moves the bonded semiconductor element and substrate out of the bonding location 13 and the apparatus is in readiness for the next cycle of operation.

SUBSTRATE AND SEMICONDUCTOR ELEMENT

Figure 2:
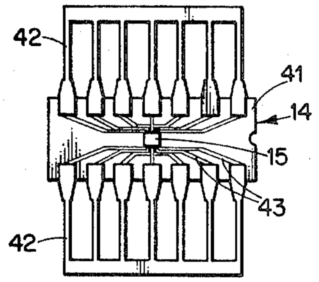
FIG. 2 is a plan view of a beam-leaded semiconductor element mounted in position on a substrate in readiness for bonding of the leads to the substrate by the apparatus of FIG. 1.
Figure 2A:
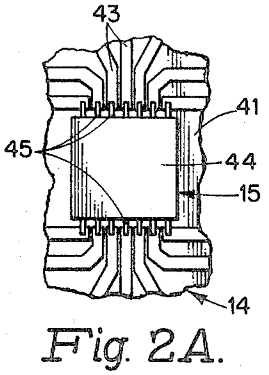
FIG. 2A is an enlarged view of a fragment of the substrate shown in FIG. 2.

A substrate 14 and semiconductor element 15 are illustrated in the plan views of FIGS. 2 and 2A. The substrate 14 includes a base member 41 of a ceramic or other insulating material, typically alumina, and a metal lead frame structure 42. The leads of the lead frame structure 42 are attached to the ceramic member 41 at the edges. A pattern of metallized areas 43 on the surface of the base extends from each of the leads to the central portion of the base where the semiconductor element is to be mounted.

The semiconductor element 14 illustrated includes a flat, rectangular die 44 of silicon containing a monolithic integrated circuit network fabricated by known processes of selective diffusion of conductivity-type imparting materials into one of the major surfaces of the die. Beam-leads 45 are fabricated on the one major surface as by the method disclosed and claimed in application Ser. No. 658,427, filed Aug. 4, 1967, by Nino P. Cerniglia and Richard C. Tonner, entitled "METHOD OF FORMING LEADS ON SEMICONDUCTOR DEVICES," now U.S. Pat, No. 3,556,951, and assigned to the assignee of the present invention. The beam-leads 45 extend laterally from two opposite side edges of the die and are generally parallel.

The semiconductor element 15 is placed on the substrate 14 with the beam-leaded surface downward. The semiconductor element is positioned so that the beam-leads 45 are in alignment with the mating areas 43 of the metallized pattern. The semiconductor element 15 may be held in position on the substrate 14 as by wax or other suitable adhesive material.

As an illustrative example, the silicon die 44 may be approximately 54 mils square and from 2 to 2½ mils thick. The beam-leads 45 as fabricated in accordance with the method disclosed in the previously mentioned application of Cerniglia and Tonner consist of thin layers of titanium and molybdenum and a much thicker layer of gold, the gold being in contact with the substrate. The portions of the beam-leads 45 extending beyond the edges of the die are approximately 6 mils long by 2 mils wide and are from 0.3 to 0.5 mils thick. As shown, seven leads are spaced evenly along each of the two opposite sides of the die. The ceramic base 41 may be of 94–98 percent alumina. The metallized areas are of gold over either nickel or molybdenum and manganese and are about 2½ microns thick.

SUBSTRATE FEEDING ARRANGEMENT

Figures 3A, 3B, 3C, 4:
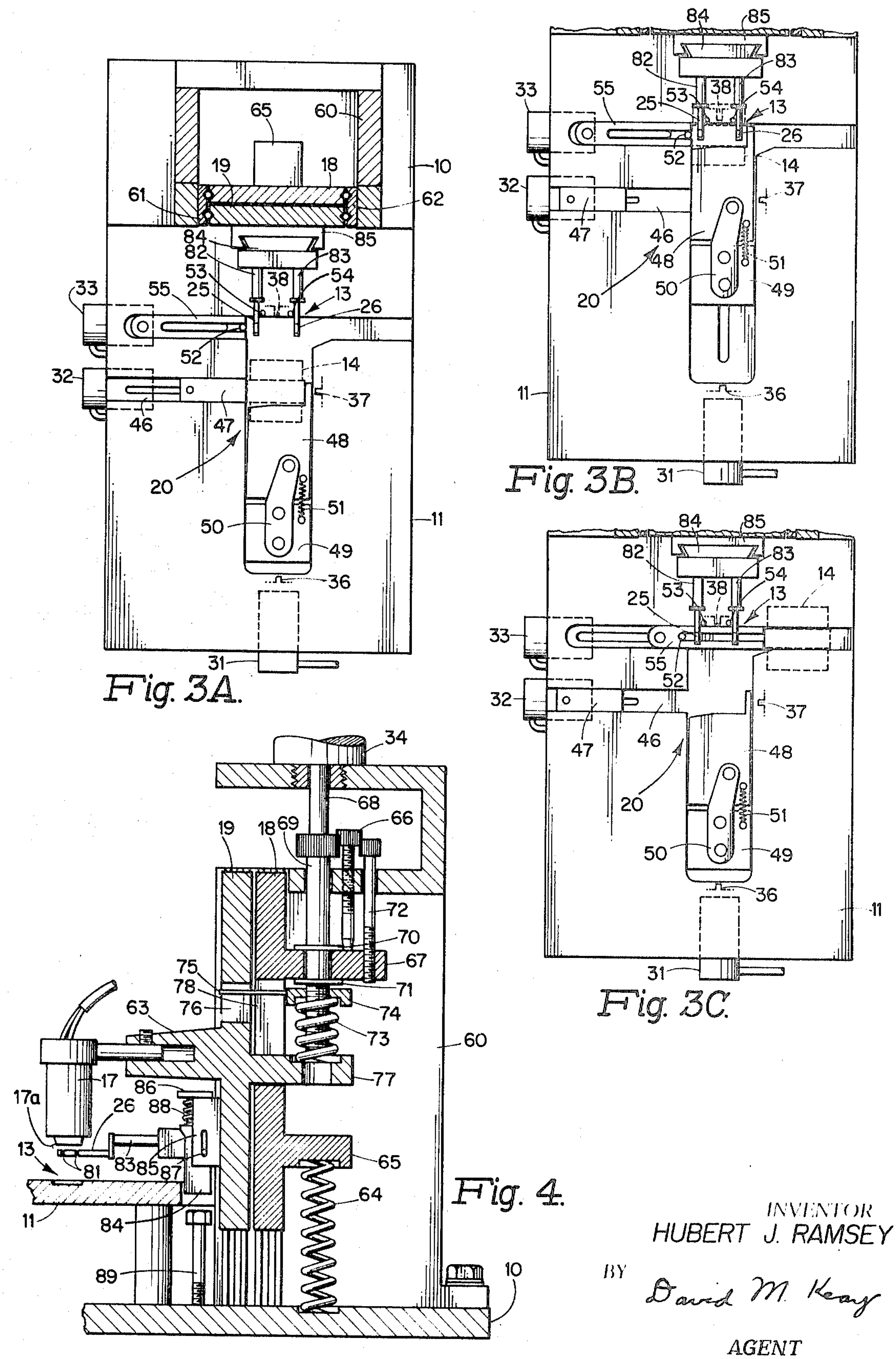
FIGS. 3A, 3B, and 3C are plan views of the apparatus of FIG. 1 at different stages of an operating cycle with portions broken away in order to show certain details.
FIG. 4 is a side elevational view of a portion of the apparatus of FIG. 1 taken in cross section.

The arrangement for feeding substrates 14 with semiconductor elements 15 mounted thereon can best be seen in FIGS. 1, 3A, 3B, and 3C. The substrates 14 are moved along the inclined track 16 (shown only in FIG. 1) by a suitable means (not shown). At the lower end of the track 16 the substrate drops into a slot 46 (see FIGS. 3A, 3B, and 3C) in the platform 11 and is engaged by a sliding member 47 which moves the substrate into position against a feed member 48. A portion of the slide member 47 beneath the platform strikes the microswitch 37 causing the control unit 35 to retract the sliding member 47 and advance a feed slide 49. The feed slide 49 is connected to the feed member 48 by an arm 50 which is fixed to the feed slide 49 and pivotally connected to the feed member 48. A tension spring 51 causes the feed member 48 to pivot with respect to the feed slide 49 as shown in FIG. 3A. As the feed slide 49 and feed member 48 advance, the substrate 14 and semiconductor element 15 are moved into position at the bonding location 13 on the platform. At the bonding location the base 41 of the substrate 14 is held against three positioning pins 52, 53, and 54 by pivotal movement of the feed member 48 as the substrate abuts the pins. (See FIG. 3B). The three-point positioning assures accurate location of the substrate and semiconductor element at the bonding location.

When the substrate moves into the bonding location 13, it strikes the microswitch 38 causing the control unit to actuate the arrangement of vertical slides 18 and 19 to perform the bonding operation as will be described in detail hereinbelow. Upon completion of the bonding operation, the feeding arrangement 20 removes the bonded substrate from the bonding location and positions a new substrate at the bonding location. This action is initiated by the control unit 35 after bonding has been completed. The feed slide 49 and feed member 48 are retracted leaving the substrate at the bonding location. A portion of the feed slide 49 beneath the platform 11 strikes the microswitch 36 causing the control unit 35 to stop movement of the feed slide 49 and feed member 48 and move an ejector slide 55. (See FIG. 3C). The ejector slide 55 advances to push the bonded substrate out of the bonding location, and then retracts. The control unit 35 then actuates the slide member 47 starting a new cycle.

As illustrated, the various portions of the feeding arrangement 20 are driven by the air cylinders 31, 32, and 33. Air under pressure is introduced to the cylinders through air lines 39 by the opening and closing of air valves within the control unit 35. The valves are controlled by the actuation of the microswitches 36, 37, and 38, connected to the control unit by wiring 40, and also by timing circuits within the control unit. The control unit 35 thus employs standard components and its design and construction to accomplish the desired results are well within the skill of the art.

BONDING MECHANISMS

The arrangement of vertical slides 18 and 19 on which the bonding tool 17 is mounted can best be seen in the overall view of FIG. 1 and the more detailed showings of FIGS. 3A and 4. The slide arrangement includes a housing 60 attached to the base of the apparatus. The first vertically movable slide member 18 is mounted in the housing 60 by ball bearings between the slide member and tracks 61 and 62. The second vertically movable slide member 19 is similarly mounted between the tracks. The bonding tool 17 is fixed to an arm 63 extending from the second slide member 19. The bonding tool 17 contains a conventional electrical heating element and temperature sensing device for heating the horizontally disposed bonding surface 17*a* at the lower end of the bonding tool and maintaining the temperature constant.

The first slide member 18 is urged vertically upward by a compression spring 64 located between a lower arm 65 of the first slide member 18 and the base 10 of the apparatus. The upper or raised position of the first slide member 18 is controlled by an adjustable stop 66 threaded through the housing 60 and abutting an upper arm 67 of the first slide member 18. The first slide member 18 is moved downward against the force of the compression spring 64 by the air cylinder 34. A rod 68 from the air cylinder bears against the end of a rod 69 which passes through an opening in the upper arm 67 of the first slide member 18 and is fixed thereto with respect to vertical movement by two retaining rings 70 and 71. Downward movement of the first slide member 18 is limited by an adjustable stop 72 threaded into the upper arm 67 of the first slide member and passing through an opening in the housing 60.

The second slide member 19 is coupled to the first slide member 18 by the rod 69, a compression spring 73, and a collar 74. The rod 69 is mounted in the upper arm 67 of the first slide member 18 by the retaining rings 70 and 71 so as to be fixed vertically but free to rotate. The lower end of the rod 69 is threaded through the collar 74 which is prevented from rotating by a projection 75 extending into a narrow vertical slot 76 in the second slide member 19. The compression spring 73 is positioned between the collar 74 and an arm 77 of the second slide member 19 which extends through an opening 78 in the first slide member 18. Thus, the second slide member 19 is urged downward by the compression spring 73 with the arm 77 abutting the first slide member 18 at the lower end of the opening 78. The amount of force exerted by the second slide member 19 against the first slide member 18 can be adjusted by rotation of the rod 69 thereby controlling the compression of the spring 73.

Thus, the second slide member 19 is arranged to move downward vertically together with the first slide member 18 until downward movement of the second slide member is impeded, as by the bonding tool abutting an object as will be described in detail hereinbelow. Further downward movement of the first slide member 18 compresses the spring 73 increasing the force exerted by the bonding tool on the object. The greater the amount of movement of the first slide member 18 with respect to the second slide member 19, the greater the compression of spring 73 and thus the force exerted by the bonding tool.

COMPLIANT RIBBON MECHANISMS

As can be seen from FIG. 1 deformable compliant filamentary material is supplied from the two reels 21 and 22 fixed to the base 10 of the apparatus. Each reel 21 and 22 contains a continuous supply of a deformable material in ribbon form, specifically aluminum. Ribbons of aluminum alloy No. 2024 approximately 4 mils by 10 mils have been found satisfactory for use with the specific semiconductor element and substrate as described previously. The ribbons 23 and 24 from the reels pass through two grooves in a guide wheel 79 which is rotatably mounted on a plate 80 fixed to the bonding tool arm. The ribbon then passes under the guide pins 25 and 26 which have recesses 81 serving as guideways for properly locating the ribbons with respect to the substrate and semiconductor element at the bonding location. From the guide pins 25 and 26 the ribbons 23 and 24 pass to the feeding mechanism 27.

As can be seen in FIGS. 1, 3A, and 4 the guide pins 25 and 26 are attached to supporting arms 82 and 83 which are mounted on the second slide member 19 by a third slide member 84. The third slide member 84 is arranged to slide vertically within a slide block 85 fixed to the second slide member 19. As can be seen in FIG. 4, the third slide member 84 is urged downward by a compression spring 88 positioned between the slide member 84 and a plate 86 fixed to the slide block 85. The amount of upward and downward movement of the slide member 84 with respect to the slide block 85 is limited by a pin 87 fixed to the slide member 84 and located in a slot in the slide block 85. An adjustable stop 89 threaded into the base 10 of the apparatus is disposed in the path of the third slide member 84. As the first and second slide members 18 and 19 are moved downward, the third slide member 84 abuts the stop 89 thus preventing further movement of the third slide member while the first and second slide members continue their downward movement compressing the compression spring 64.

Figure 5:
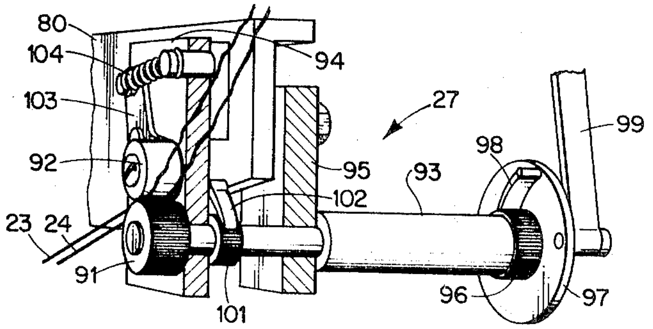
FIG. 5 is a perspective view illustrating certain details of the apparatus, specifically the filamentary material feeding mechanism.
Figure 6:
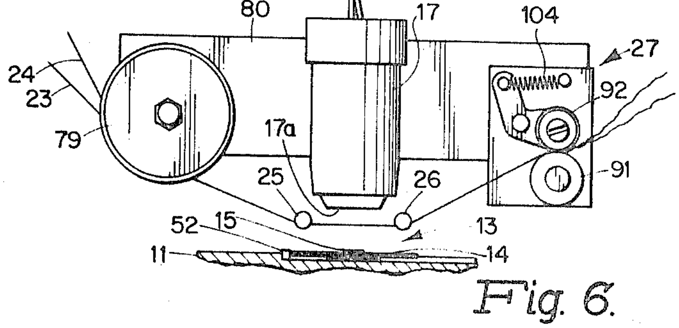
FIG. 6 is a front elevational view showing certain of the elements of the apparatus at the start of a bonding operation.

The ribbons 23 and 24 pass from beneath the two guide pins 25 and 26 to between two rollers 91 and 92 of the ribbon-feeding mechanism 27 as can be seen in FIGS. 1, 5, and 6. The driving roller 91 is mounted on one end of a rotatable shaft 93 which passes through two supporting plates 94 and 95 fixed to the plate 80. A gear 96 is fixed to the end of the shaft opposite the driving roller 91, and a plate 97 is rotatably mounted on the shaft 93 adjacent the gear 96. A spring pawl 98 is fixed at one end to the plate 97 and the other end presses against the gear 96. The plate 97 is pivotally attached to one end of a link 99 which is pivotally attached at its other end to one end of a lever arm 100. (See FIG. 1). A pin at the other end of the lever arm 100 travels in a horizontal slot in the second slide member 19. At an intermediate point the lever arm is pivotally mounted to the housing 60.

During downward movement of the second slide member 19 the plate 97 turns, but the pawl 98 is arranged so as to slip over the gear teeth. Any tendency of the shaft 93 to rotate is prevented by a ratchet wheel 101 fixed to the shaft and engaged by a pawl 102 mounted on the plate 80. During upward movement of the second slide member 19, the plate 97 turns and the pawl 98 engages the gear teeth thus rotating the shaft 94 and driving roller 91. The ratchet wheel 101 and pawl 102 are arranged so as to slip during rotation of the shaft in this direction.

The driven roller 92 is carried by an arm 103 and biased against the driving roller 91 by a tension spring 104. Thus, as the second slide member 19 moves upward, the shaft 93 is rotated turning the feed rollers 91 and 92 and advancing the ribbons 23 and 24.

OPERATION

The apparatus as described operates to thermal compression bond the beam-leads 45 of a semiconductor element 15 to the metallized areas 43 of a substrate 14 in the following manner. Substrates 14 with semiconductor elements 15 properly positioned thereon are moved down the inclined track 16. The lowermost substrate moves into the slot 46 in the platform where it is engaged by the slide member 47 and transferred to the feed member 48. The feed slide 49 and feed member 48 move the substrate into proper position abutting the three positioning pins 52, 53, and 54 at the bonding location 13. As the substrate moves into the bonding location it strikes the microswitch 38 initiating the bonding operation under control of the control unit 35.

The control unit 35 causes air under pressure to be fed to the air cylinder 34 thus moving the first slide member 18 downward from its raised position. When the slide member is in the raised position as illustrated in FIG. 6, the bonding surface 17*a* of the bonding tool 17 is positioned directly above the semiconductor element and the substrate and lengths 23 and 24 of ribbon are positioned by the guide pins 25 and 26 so as to lie directly above the beam-leads 45 of the semiconductor element 15. Each of the ribbons is disposed generally normal to the leads extending from the side edges of the semiconductor element.

As the first movable slide member 18 is urged downward against the compression spring 64 by the air cylinder 34, the second movable slide member 19, which is urged downward against the first slide member 18 by the compression spring 73, also moves downward with the first movable slide member. The bonding tool 17, ribbon guide wheel 79, and ribbon feed mechanism 27 which are supported on the second slide member 19 move downward with the slide members. The guide pins 25 and 26 which are mounted to the third slide member 84 also move downward with the first and second slide members.

Figure 7:
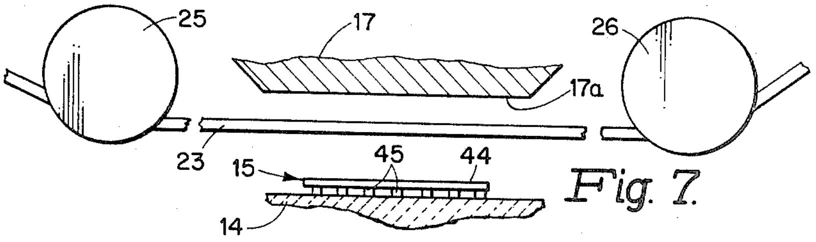
FIG. 7 is an enlarged front elevational view illustrating certain of the elements of the apparatus at a later stage of the bonding operation.

This movement continues until the third slide member 84 abuts the stop 89. The position of certain of the elements at this stage is illustrated in FIG. 7. The guide pins 25 and 26 position the lengths of ribbon 23 and 24 adjacent the beam-leads 45 extending from the semiconductor die 44. The bonding surface **17*a* of the bonding tool 17** is spaced directly above the lengths of ribbon.

Figure 8:
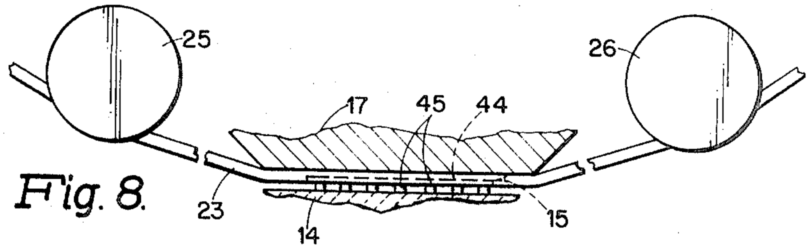
FIG. 8 is an enlarged front elevational view illustrating certain of the elements of the apparatus while bonding is taking place.

The first slide member 18 continues its downward movement carrying the second slide member 19 with it. The guide pins 25 and 26 remain stationary. The continued downward movement of the first and second slide member 18 and 19 carries the bonding tool 17 downward until the bonding surface **17*a* comes in contact with the lengths of ribbon and then pushes the ribbons downward into contact with the beam-leads. Certain of the elements at this stage are illustrated in FIG. 8. During this portion of the operation the guide wheel 79 and the ribbon-feeding mechanism 27, which are fixed with respect to the bonding tool, continue to move downward while the guide pins 25 and 26 do not. However, the arrangement of the elements is such that the ribbons 23 and 24 remain within the guideways of the guide pins 25 and 26**.

Figure 9:
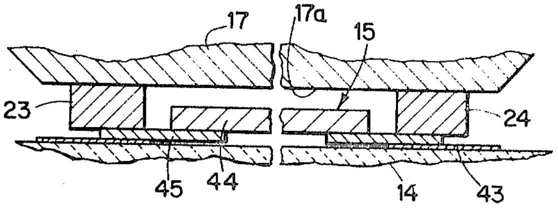
FIG. 9 is a much enlarged side elevational view illustrating certain of the elements of the apparatus at the same instant in the bonding operation as illustrated in FIG. 8.

The positions of certain of the elements when the bonding tool 17 compresses the compliant ribbons 23 and 24 against the beam-leads 45 and the beam-leads against the metallized areas 43 of the substrate 14 is illustrated in the enlarged side view of FIG. 9 as well as in FIG. 8. The semiconductor die 44 is thinner than the compliant ribbons 23 and 24 and thus the force of the bonding tool is exerted on the leads 45 and not on the die 44.

Further downward movement of the first slide member 18 compresses the compression spring 73 and increases the force exerted by the bonding tool 17 on the underlying elements. There is no significant movement of the second slide member 19 and bonding tool 17 except as the bonding tool compresses and deforms the underlying elements. The first slide member 18 continues to move with respect to the second slide member 19 thus further compressing the spring 73 and increasing the downward force exerted by the bonding tool 17 until the stop 72 carried by the first slide member 18 abuts the housing 60. The total amount of force exerted by the bonding tool depends on the total amount of compression of the spring 73, as regulated by the original compression set by rotation of the rod 69 plus the compression due to movement of the first slide member 18 with respect to the second slide member 19.

As illustrated in FIG. 8, and more particularly in FIG. 9, the ribbons 23 and 24 lie between the portions of the beam-leads 45 overlying the metallized areas 43 of the substrate 14 and the bonding surface **17*a* of the bonding tool 17. The compliant ribbons 23 and 24 deform under the applied force so that every beam-lead 45 is uniformly pressed against the corresponding metallized area 43. Heat from the bonding tool 17 flows through the ribbons and the beam-leads 45 to the regions of contact between the beam-leads 45 and the metallized areas 43**. The heat and pressure at these regions are such as to effect thermal compression bonds between each of the beam leads and the corresponding metallized area. For the specific semiconductor element and substrate described previously, a bonding tool temperature of 530° C. and a total downward force of about 10 pounds have been found to produce satisfactory bonds. Pressure is maintained for approximately 1½ seconds.

After the appropriate time to ensure proper bonding has elapsed, as controlled by a timer in the control unit 35, the control unit shuts off air to the air cylinder 34 to start the return movement of the slides. The compression spring 64 urges the first moveable slide member 18 upwards relaxing the compression spring 73 and reducing the pressure of the bonding tool on the underlying elements. Continued movement of the first slide member 18 carries the second slide member 19 and bonding tool upward.

Figure 10:
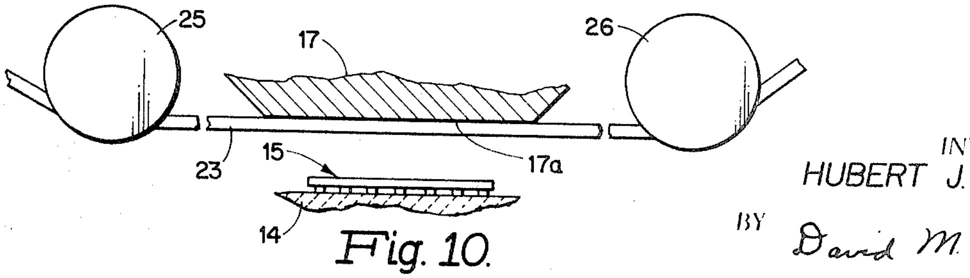
FIG. 10 is an enlarged front elevational view illustrating certain of the elements of the apparatus at a stage in the operation subsequent to bonding.

As the bonding tool moves upward it carries with it the compliant ribbons 23 and 24 which tend to stick to the bonding surface **17*a*, as illustrated in FIG. 10. Since the guide wheel 79 and the ribbon feeding mechanism 27 also move upward with the bonding tool, there is a tendency for the ribbons to be carried upward with them. This movement continues until the ribbons are carried upward into the guideways of the guide pins 25 and 26 which have not yet moved upward. Further upward movement of the bonding tool separates the bonding tool from the ribbons. As this action occurs, the ribbons cool very rapidly because of their relatively small mass. When the slide block 85 fixed to the second movable slide member 19 moves sufficiently such that the pin 87 in the third slide member 84 abuts the lower edge of the slot in the slide block 85, the guide pins 25 and 26** are then carried upward with the first and second movable slide members.

As the slide members 18 and 19 return toward their upward or raised position the ribbon feed mechanism 27 causes the ribbons 23 and 24 to advance and replace the used lengths of compliant ribbon with new lengths from the reels 21 and 22. The upward movement of the second slide member 19 moves the end of the lever arm 100 thereby rotating the plate 97 carrying the pawl 98 which engages the gear 96 and thus rotates the shaft 93. Rotation of the shaft 93 rotates the driving roller 91 and advances the ribbons which are held between the driving roller 91 and the driven roller 92.

When the slide members 18 and 19 together with the bonding tool have returned to the raised position, the control unit 35 removes air from the air cylinder 31 causing the feed slide 49 and the feed member 48 to be retracted. The feed slide 49 strikes the microswitch 36 causing the control unit to actuate the air cylinder 33 which drives the ejection slide 55 thus removing the bonded semiconductor element and substrate from the bonding location. Thus, an operating cycle is completed and the apparatus is prepared with new lengths of compliant ribbon in position between the guide pins 25 and 26 in readiness for the next bonding cycle on the next succeeding semiconductor element and substrate.

CONCLUSION

The apparatus in accordance with the invention employs continuous supplies of uniform ribbon for the compliant material. Thus, no preliminary specialized preparation of the compliant material is required for each configuration of semiconductor element or substrate. Precise alignment or indexing of the compliant material with respect to the semiconductor element and substrate after each loading cycle is unnecessary. The ribbon-feed mechanism merely removes the used ribbon from between the guide pins and feeds new lengths of ribbon into position. No precision is necessary. The width between the compliant ribbons very easily may be adjusted for different sizes of semiconductor elements by substituting guide pins with appropriate spacing between the guideways.

The use of two narrow ribbons rather than a relatively massive stripe of compliant material requires that less heat be supplied by the bonding tool. The ribbons dissipate very little heat along their lengths as heat flows from the bonding tool through the compliant ribbons and the beam-leads to the regions of contact between the beam-leads and the metallized areas. Therefore, uniform bonding temperatures are obtained at the regions of contact in a very short time. In addition, as the bonding tool separates from the ribbons during retraction, the ribbons cool very quickly. Therefore, the stress placed on the ribbons by the ribbon-feeding mechanism takes place after sufficient cooling has occurred so that the chance of breakage is reduced.

While there has been shown and described what is considered a preferred embodiment of the present invention, it will be obvious to those skilled in the art that various changes and modifications may be made therein without departing from the invention.

I claim:

1. Apparatus for bonding a plurality of leads of a semiconductor element to a substrate including in combination
means for positioning at a bonding location a substrate having a semiconductor element thereon;
a supply of filamentary material;
filamentary material guide means for positioning a length of filamentary material from the supply adjacent leads of the semiconductor element;
a bonding tool having a bonding surface;
advancing means for moving the bonding tool and the length of filamentary material to press the bonding surface against the length of filamentary material and compress the leads between the filamentary material and the substrate;
bonding means including the bonding tool for bonding the leads to the substrate while the leads are compressed between the filamentary material and the substrate by the bonding tool;
retracting means for withdrawing the bonding tool and the length of filamentary material from the leads; and
filamentary material feeding means for feeding the filamentary material to replace the length of filamentary material with a new length of filamentary material from the supply.

2. Apparatus in accordance with claim 1 wherein said filamentary material is a ribbon of deformable material.

3. Apparatus for bonding the leads of a semiconductor element to a substrate, said semiconductor element having a plurality of leads extending in a generally planar array from each of two opposite side edges of a body of semiconductor material, said semiconductor element being mounted on the surface of a substrate with the leads aligned with conductive regions on the surface of the substrate, said apparatus including in combination
means for positioning a substrate and semiconductor element at a bonding location in a predetermined orientation;
a first supply of filamentary material;
first filamentary material guide means for positioning a first length of filamentary material from the first supply adjacent the leads extending from one side edge of the body of semiconductor material, the first length of filamentary material being disposed generally normal to each of the leads with the leads lying between the first length of filamentary material and the substrate;
a second supply of filamentary material;
second filamentary material guide means for positioning a second length of filamentary material from the second supply adjacent leads extending from the opposite side edge of the body of semiconductor material, the second length of filamentary material being disposed generally normal to each of the leads with the leads lying between the second length of filamentary material and the substrate;
a bonding tool having a bonding surface;
advancing means for moving the bonding tool and the lengths of filamentary material to press the bonding surface against the lengths of filamentary material and compress the leads between the lengths of filamentary material and the conductive regions of the substrate;
heating means for applying heat to the leads and the conductive regions while the leads are compressed between the filamentary material and the conductive regions of the substrate to bond the leads to the conductive regions;
retracting means for withdrawing the bonding tool and the lengths of filamentary material from the leads; and
filamentary material feeding means for feeding the filamentary material to replace the used lengths of filamentary material with new lengths of filamentary material from the supplies.

4. Apparatus in accordance with claim 3 wherein said filamentary material is a ribbon of deformable material having a thickness greater than the thickness of the body of semiconductor material of the semiconductor element.

5. Apparatus in accordance with claim 4 wherein the bonding surface of said bonding tool is a flat planar surface and said means for applying heat to the leads and to the conductive regions includes means for heating the bonding tool.

6. Apparatus in accordance with claim 5 including
moving means for moving the bonding tool toward and away from the bonding location; and
filamentary material positioning means coupled to said moving means for moving the lengths of filamentary material toward the bonding location for a distance less than the distance of movement of the bonding tool whereby the bonding tool contacts the lengths of filamentary material and presses the lengths of filamentary material against the leads of the semiconductor element.

7. Apparatus in accordance with claim 6 including means coupled to said moving means for feeding the filamentary material to replace the used lengths of filamentary material with new lengths of filamentary material from the supplies during movement of said bonding tool in a direction away from the bonding location.

8. Apparatus for bonding the leads of a semiconductor element to a substrate, said semiconductor element including a flat rectangular body of semiconductor material with leads extending laterally from two opposite side edges of the body in a generally planar array and generally parallel to each other, said semiconductor element being mounted on the surface of a substrate with the leads aligned with conductive regions on the surface of the substrate, said apparatus including in combination
means for positioning a substrate and semiconductor element at a bonding location in a predetermined orientation;
a fixed support;
a first movable member mounted on the support and adapted to be moved vertically with respect to the support between a raised position and a lowered position;
a second movable member carried by the first movable member and adapted to be moved vertically a limited distance with respect to the first movable member;
biasing means for biasing the second movable member vertically downward with respect to the first movable member;
a first continuous supply of filamentary material;
a second continuous supply of filamentary material;
filamentary material guide pins extending horizontally from the second movable member and having guideways therein for positioning first and second lengths of filamentary material from said first and second supplies, respectively, directly above and generally normal to the leads extending from one side edge and the opposite side edge, respectively, of the body of a semiconductor element on a substrate in the bonding location;
a stop fixed with respect to said support for stopping downward movement of the second movable member at a lowered position with the lengths of filamentary material located closely adjacent but spaced from the leads of the semiconductor element;
a bonding tool having a flat horizontal bonding surface at the lower end thereof;
means mounting said bonding tool on the first movable member for permitting the bonding tool to be moved vertically a limited distance with respect to the first movable member;
said bonding tool being disposed with the bonding surface directly above the semiconductor element on a substrate at the bonding location;

biasing means for biasing the bonding tool vertically downward with respect to the first movable member;

the bonding surface of said bonding tool being located above the semiconductor element on a substrate at the bonding location a predetermined distance less than the distance of movement of the first movable member between the raised and lowered positions thereof whereby when the first movable member is lowered to the lowered position, the bonding surface of the bonding tool contacts the lengths of filamentary material and moves the lengths of filamentary material into contact with the leads of the semiconductor element at the bonding location pressing the leads against the conductive regions of the substrate;

heating means for heating the bonding surface of the bonding tool whereby when the bonding tool contacts the lengths of filamentary material and presses the leads against the conductive regions of the substrate, heat flows to the leads and conductive regions bonding the leads to the conductive regions;

feeding means coupled to the first movable member for feeding the filamentary material to replace the lengths of filamentary material with new lengths of filamentary material from the supplies in response to movement of the first movable member from the lowered position to the raised position; and means for moving the first movable member vertically between the raised and lowered positions.

9. Apparatus in accordance with claim 8 wherein said filamentary material is a ribbon of deformable material having a thickness greater than the thickness of the body of semiconductor material of the semiconductor element.

* * * * *